(12) United States Patent
Nilsson et al.

(10) Patent No.: US 7,699,956 B2
(45) Date of Patent: Apr. 20, 2010

(54) METHOD AND A MACHINE FOR MAKING A CELL STRUCTURE

(75) Inventors: Torsten Nilsson, Torsby (SE); Lenart Corbeus, Sunne (SE)

(73) Assignee: Airwood Sweden Aktiebolag, Torsby (SE)

( * ) Notice: Subject to any disclaimer, the term of this patent is extended or adjusted under 35 U.S.C. 154(b) by 1283 days.

(21) Appl. No.: 10/518,236

(22) PCT Filed: Jun. 27, 2003

(86) PCT No.: PCT/SE03/01121

§ 371 (c)(1),
(2), (4) Date: Aug. 15, 2005

(87) PCT Pub. No.: WO2004/002730

PCT Pub. Date: Jan. 8, 2004

(65) Prior Publication Data

US 2006/0096698 A1 May 11, 2006

(30) Foreign Application Priority Data

Jun. 27, 2002 (SE) .................................. 0202008

(51) Int. Cl.
*B29C 65/00* (2006.01)
(52) U.S. Cl. .................. 156/296; 156/182; 156/556; 156/578
(58) Field of Classification Search .................. 156/64, 156/182, 296, 297, 556, 578; 428/116
See application file for complete search history.

(56) References Cited

U.S. PATENT DOCUMENTS

| | | | |
|---|---|---|---|
| 2,477,852 A | 8/1949 | Bacon | |
| 3,773,584 A | 11/1973 | Dietzsch | |
| 4,555,299 A * | 11/1985 | Voltmer et al. | 156/552 |
| 5,738,922 A | 4/1998 | Kobayashi | |
| 6,119,344 A | 9/2000 | Court | |
| 6,199,342 B1 | 3/2001 | Court | |

FOREIGN PATENT DOCUMENTS

| | | |
|---|---|---|
| EP | 0338461 A2 | 10/1989 |
| WO | WO 9734063 A1 | 8/1997 |

* cited by examiner

*Primary Examiner*—Khanh Nguyen
*Assistant Examiner*—Daniel Lee
(74) *Attorney, Agent, or Firm*—Jeffrey S. Melcher; Manelli Denison & Selter PLLC

(57) ABSTRACT

The invention relates to a method for making a cellular structure (1) comprising a plurality of elements (2), in which method a first plurality of elements (2) is provided that form a first row (3) of elements, and that furthermore a second plurality of elements (2) is provided that form a second row (4) of elements (2). The second row (4) is parallel to the first row (3) but displaced in phase in relation to this. An adhesive is applied to the elements (2) in at least one of the two rows (3, 4) and at least one of the two rows (3, 4) is brought closer to the other, so that the two rows are brought together and thereby bonded to one another by the adhesive. The invention also relates to a machine for executing the method according to the invention.

13 Claims, 15 Drawing Sheets

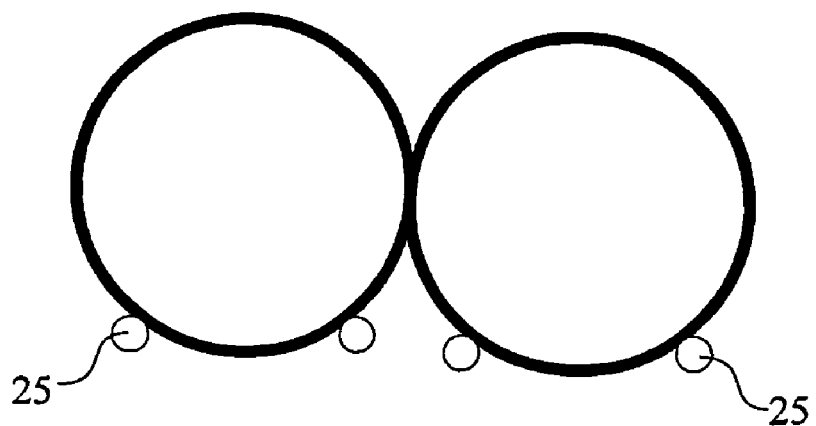
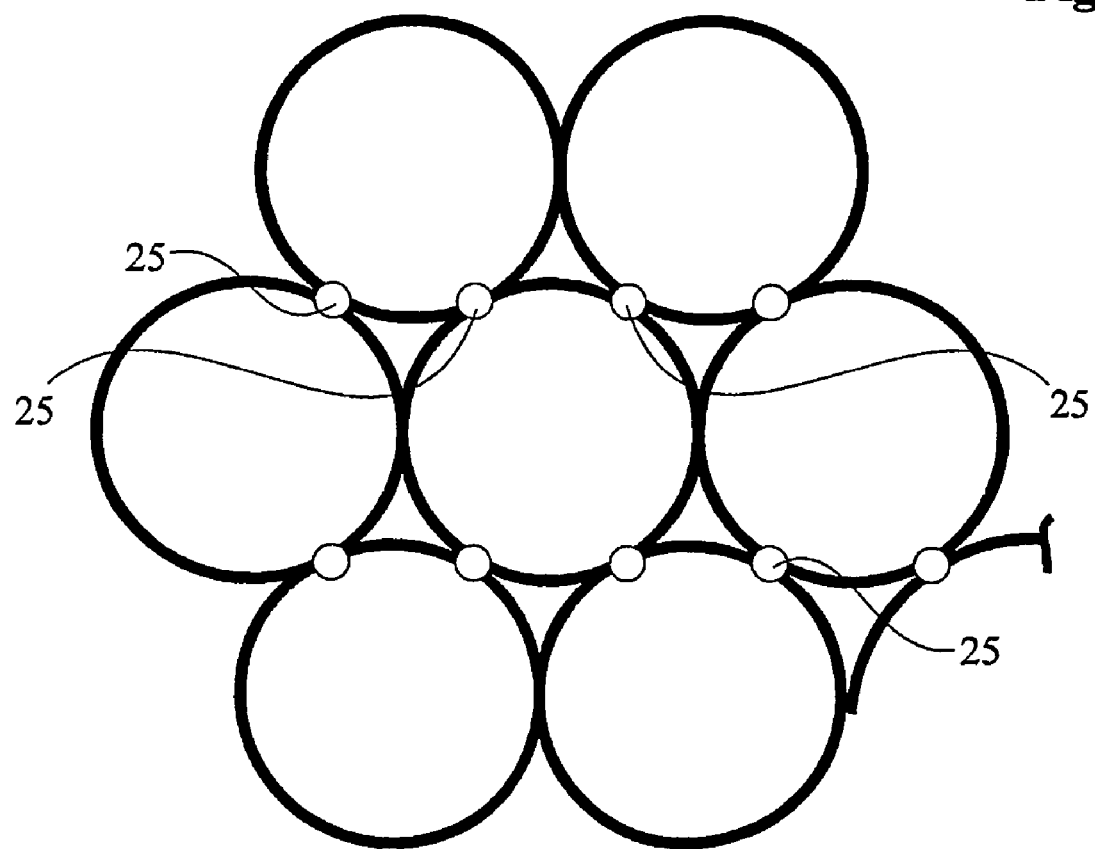
Fig. 13

Fig. 17
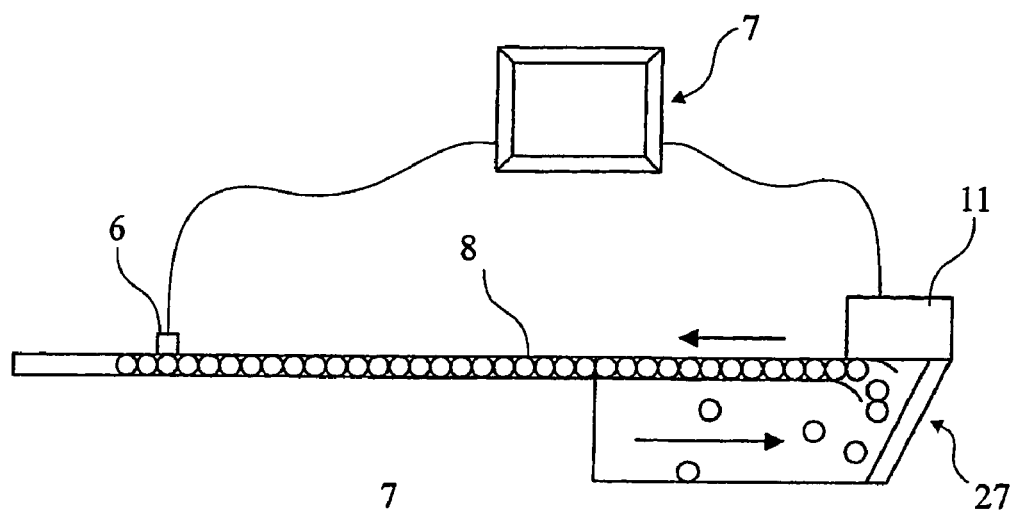
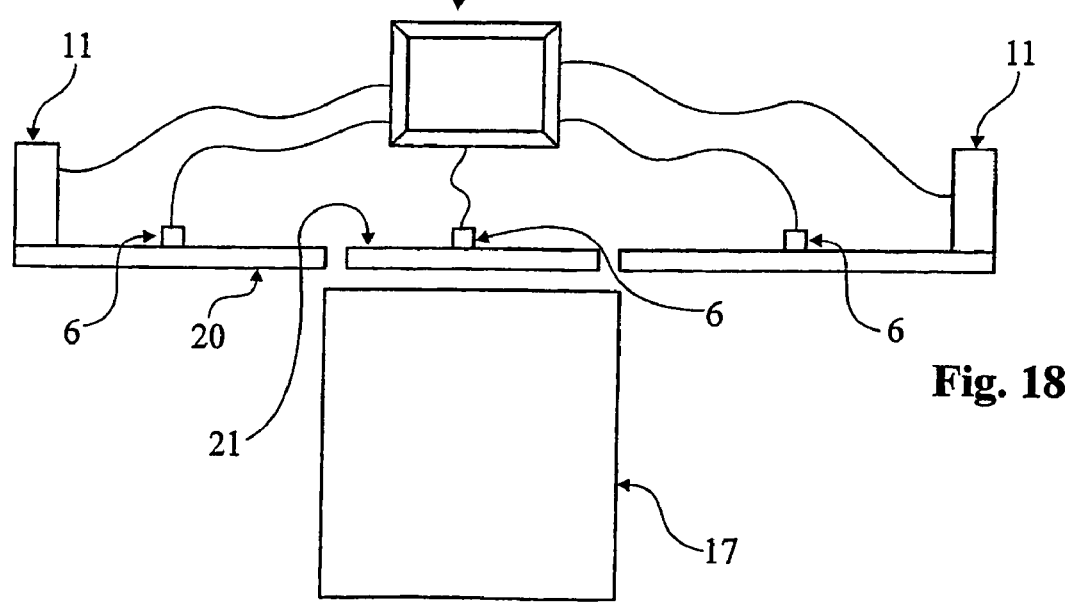
Fig. 18

METHOD AND A MACHINE FOR MAKING A CELL STRUCTURE

TECHNICAL FIELD

The present invention relates to a method and a machine for making a cell structure comprising a plurality of elements. The elements forming part of the cell structure can consist of short tube pieces glued fixedly to one another. A cell structure of this kind can be used for example as part of a sandwich construction in building elements and in this case promotes strength in combination with low weight.

PRIOR ART

A cell structure composed of a plurality of tubular elements is known previously from U.S. Pat. No. 2,477,852, for example. The tubular elements are stated to be able to have a length from around ¼ inch to 2 inches (6.4 mm to 51 mm) and a diameter from ¼ inch to 2 inches (6.4 mm to 51 mm). The tubular elements or tube pieces are stated to be able to be joined to one another by applying adhesive, for example.

OBJECT OF THE INVENTION

The object of the invention is to provide a method and a machine for making a cell structure from a plurality of elements. Another object of the invention is to provide a method and a machine for making a cell structure that permits automatic production with a high level of productivity and high operating reliability. A further object of the invention is to provide a machine that can be adapted to the size of the elements forming part of the cell structure.

DESCRIPTION OF THE INVENTION

The method according to the invention relates to production of a cellular structure comprising a plurality of elements. The cell structure that is produced by means of the method according to the invention can be used for example as part of a sandwich construction in building elements. According to the inventive method, a first plurality of uniform elements (elements having the same shape) is provided, which form a first row of elements. Furthermore, a second plurality of uniform elements is provided, which also have the same form as the elements in the first plurality and which form a second row of elements. The second row suitably contains as many elements as the first row. The second row is also preferably parallel to the first row, but preferably displaced in phase in relation to the first row. The term "displaced in phase" is understood here to mean that the second row is displaced by a certain distance in its longitudinal direction in relation to the first row, which distance is less than the extension of one of the uniform elements in the longitudinal direction of the two rows. An adhesive is applied to the elements in at least one of the two rows and at least one of the two rows is brought closer to the other, so that the two rows are brought together and thereby bonded to one another by the adhesive. The two rows will then thereby form a composite cell structure, which is then located in a first position. To add to the cell structure, a third plurality of elements is then provided, which form a third row of elements. The third row of elements is suitably parallel to the rows in the composite cellular structure. The cell structure already existing is moved a certain distance in the longitudinal direction of the first and second row of elements, so that the cellular structure is moved from the first position to a second position. An adhesive is applied to elements in at least one of the second row and the third row. The adhesive can be applied in this case either before, after or at the same time as the cellular structure is moved to the second position. The third row and the cell structure can then be brought together with one another so that they are thereby bonded to one another by the adhesive. The third row thereby becomes part of the cellular structure.

In the method according to the invention, it is the case that the second plurality of elements is best supplied in that elements intended to form the second plurality of elements are fed in a direction parallel to the first row of elements until a predetermined number of elements that form a second row parallel to the first is located in a predetermined position, so that the second row is complete. Bringing the elements in at least one of the two rows closer to the other then takes place after the second row has attained its predetermined position.

According to a particularly advantageous variant of the invention, the second plurality of elements is provided in that elements intended to form the second plurality of elements are fed from two opposing directions. The two opposing directions are both parallel to the first row of elements and elements are transported until the elements fed in one direction meet elements transported in the opposing direction, and together with the elements transported from the other direction form a second row of elements. Feeding from each direction can also be interrupted after a predetermined number of elements has been transported. Of course, it is the case with all embodiments that the feed can be interrupted after a predetermined number of elements has been transported. Bringing at least one of the two rows closer to the other takes place finally after the second row has been formed.

Interrupting the feed after a predetermined number of elements has been transported can be achieved in the following manner, for example. During feeding of the preferably circular-cylindrical elements, elements are allowed in both feed directions to pass a detector linked to a control unit/logic unit. The logic unit senses how many circular-cylindrical elements pass the detector and after a predetermined number of elements has passed, the control unit/logic unit emits a signal that the feed is to be interrupted.

It is preferably the case that all elements have the same shape and have a circular-cylindrical shape, so that the composite cell structure formed will consist of a plurality of cylinders that are joined together, preferably glued.

Bringing together of the elements in the first and second row of elements preferably takes place in that the elements in the second row are conveyed at the same time towards the first row, so that the whole of the second row is conveyed towards the first row as a coherent unit.

When adhesive is applied to the elements in a row, this can best be carried out as follows. The adhesive is applied to the elements in that a carriage provided with at least one sensor and a nozzle connected to a source of adhesive is guided along the row at a predetermined speed. The sensor is placed at a distance from the nozzle and detects the presence or absence of an element. The sensor emits a signal to a logic unit when the presence of an element is detected and the logic unit can then calculate, starting out from the known speed and the distance between the nozzle and the carriage's sensor, the time that remains until the nozzle is located in a certain position in relation to an element detected by the sensor. The logic unit can then emit a pulse to activate the nozzle when the time calculated has elapsed, so that adhesive is dispensed towards the preferably circular-cylindrical element when the nozzle passes it. Furthermore, it can thereby be ensured that adhesive is applied to the correct part of the element.

The invention also relates to a machine for making a cell structure comprising a plurality of elements. The machine according to the invention comprises a guide with inner walls that are preferably straight and form a channel in which a plurality of uniform elements can be fed forwards. The channel can best be arranged to be fed from two different directions.

Furthermore, the machine comprises one or more drives/driving devices disposed to act on elements placed in the channel to convey these in a first direction, so that a coherent row of elements can be conveyed forwards in the channel. A carrier is arranged in connection with the channel and the carrier has an extension that is principally parallel to the first direction. The carrier is also movable in a second direction principally perpendicular to the first direction, so that the carrier can move in the second direction and in doing so take with it a coherent row of elements that have been transported in the channel, so that the row is transported to an end position for the movement of the carrier in the second direction. In an advantageous embodiment, the guide comprises two fixed parts and a movable part, the movable part of the guide being arranged so that it can move in the vertical direction together with the carrier from a first position, in which the movable guide part is located in a plane separate from the working surface of the table, to a second position in which at least part of the movable guide part is located on a level with the working surface of the table. The movable guide part comprises a support on which elements for the cellular structure can be placed, which support forms a floor in the channel, and the support can be adjusted in the vertical direction so that elements of different height can be placed in the correct position in relation to the carrier. The machine is provided with at least one nozzle that is connected to a source of adhesive. The nozzle is disposed to be movable in a direction parallel to the first direction and is either disposed to apply adhesive to a row of elements that have just been conveyed to the end position, or to apply adhesive to a row of elements before these have begun to be conveyed towards the end position by the carrier. The nozzle can thus move along a coherent group of elements and apply adhesive to these.

In an advantageous embodiment of the invention, at least one sensor disposed to detect the elements transported in the channel is located in connection with the channel. The sensor is suitably linked to the driving device in this case—for example via a logic unit—so that it is possible to interrupt the transportation of elements when a predetermined number of elements has passed the sensor.

The machine according to the invention suitably comprises a table for receiving a coherent row of elements, which table has a flat working surface on which the elements received can slide. The carrier is arranged in this case in such a way in relation to the table that the movement of the carrier up to the end position for its movement in the second direction can carry elements from the channel to the table for delivery onto the working surface of the table. In a preferred embodiment, the table is movable in a direction perpendicular to the direction of movement of the carrier and parallel to the first direction.

A plate or beam is suitably arranged in connection with the table, which plate or beam is movable in a direction to and from the working surface of the table. It is thereby possible to correct any positional errors of the individual elements after two rows have been brought together.

The machine is preferably provided with a stand on which a carriage is arranged movably in connection with the working surface of the table. On the carriage, the nozzle is arranged so that on movement of the carriage, the nozzle can be guided along a row of elements standing on the working surface of the table. The carriage is provided in this case with at least one sensor that can detect the presence of an element placed on the table. The sensor is placed at a distance from the nozzle in the direction of movement of the carriage. The carriage preferably has two sensors. The carriage can be driven at a predetermined speed and the machine comprises a logic unit that knows the predetermined speed and the distance between the sensor and the nozzle of the carriage. The logic unit is also connected to the carriage's sensor, so that while the carriage is moving the logic unit can calculate the time remaining before the nozzle is located in a certain position in relation to an element detected by the sensor.

DESCRIPTION OF DRAWINGS

FIG. 13 shows in greater detail a part of the finished cell structure in which the joining points have been marked.

FIG. 17 shows diagrammatically seen from above feeding of the circular-cylindrical elements from one end of the machine.

FIG. 18 shows diagrammatically how the feeding of elements can be controlled.

DETAILED DESCRIPTION OF THE INVENTION

Figure 1:
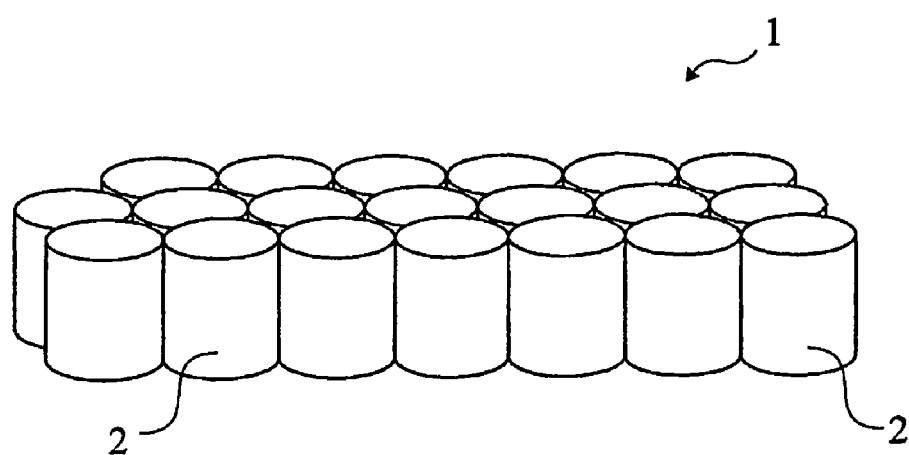
FIG. 1 shows, in perspective, a cell structure produced according to the method according to the invention.
Figure 2:
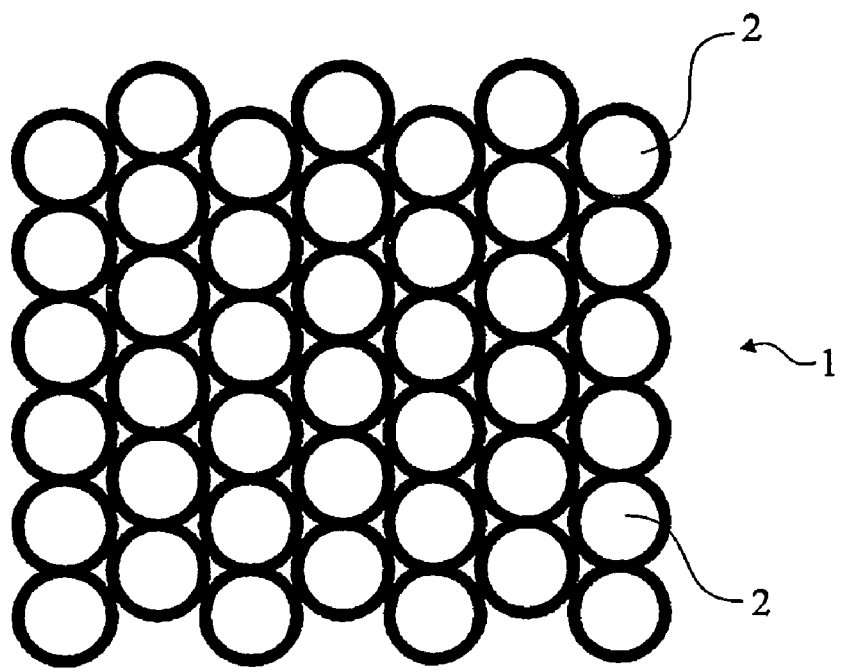
FIG. 2 shows diagrammatically and seen from above a cell structure produced according to the method according to the invention.
Figure 3:
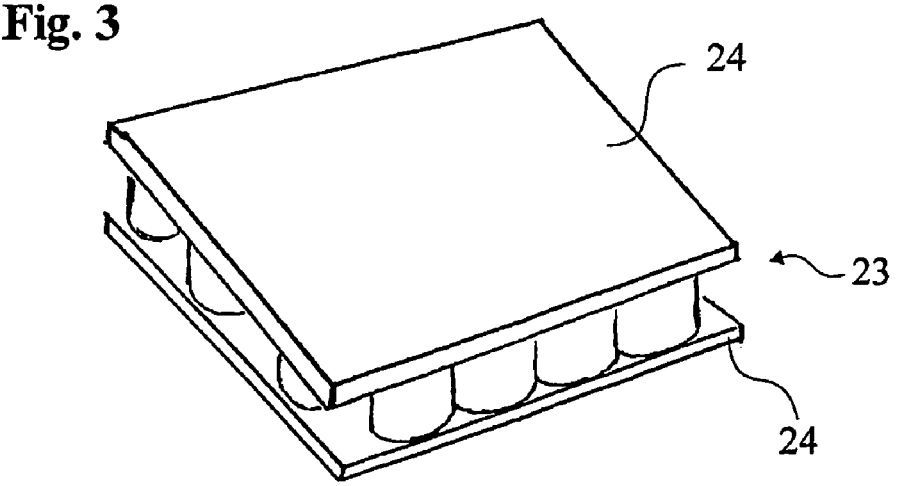
FIG. 3 shows, in perspective, a building element containing a cell structure produced according to the method according to the invention.

FIG. 1 shows a composite cell structure 1, which is composed of a plurality of circular-cylindrical tube parts 2. FIG. 2 shows a cell structure of this kind seen from above. Such a cell structure can be used for example as part of a sandwich construction in building elements. A building element that contains such a cell structure can be obtained by gluing boards, for example particle boards, to opposing sides of the cell structure. An example of such a building element is shown in FIG. 3, in which a cell structure 1 forms a layer in a building element 23 that has been formed by gluing particle boards 24, for example, firmly to opposing sides of the cell structure 1.

The invention shall now be explained with reference to FIGS. 4-6. According to the method according to the invention, a first plurality of uniform elements 2 (elements that have the same shape) is provided, which form a first row 3 of elements. A second plurality of uniform elements 2 is also provided, which also have the same shape as the elements 2 in the first plurality and which form a second row 4 of elements. The second row 4 suitably contains as many elements as the first row 3. The second row 4 is also preferably parallel to the first row 3, but preferably displaced in phase relative to the first row. The term "displaced in phase" is understood here to mean that the second row 4 is displaced by a certain distance in its longitudinal direction in relation to the first row 3, which distance is less than the extension of one of the uniform elements 2 in the longitudinal direction of the two rows 3, 4. An adhesive is applied to the elements 2 in at least one of the two rows 3, 4 and at least one of the two rows 3, 4 is brought closer to the other so that the two rows 3, 4 are brought together and thereby bonded to one another by the adhesive. The two rows 3, 4 will then thereby form a composite cell structure 1, which is then located in a first position. To add to the cell structure 1, a third plurality of elements 2 is then provided, which form a third row 5 of elements, which is evident from FIG. 5. The third row 5 of elements 2 is suitably parallel to the rows 3, 4 in the composite cellular structure 1. The cell structure 1 already existing is moved a certain distance in a longitudinal direction of the first 3 and the second row 4 of elements 2 so that the cellular structure 1 is moved from the first position to a second position. An adhesive is applied to the elements 2 in at least one of the second row 4 and the third row 5. The adhesive can be applied in this case either before, after or at the same time as the cellular structure 1 is moved to the second position. The third row 5 and cell structure 1 can then be brought together with one another so that they are thereby bonded to one another by the adhesive. The third row 5 thereby becomes part of the cellular structure 1. The cell structure 1 thus obtained can then be added to by a fourth row as indicated in FIG. 6. It is naturally possible then to add any further number of rows of elements 2 to the cell structure 1.

In the method according to the invention, it is the case that the second plurality of elements 2 is best provided in that elements 2 intended to form the second plurality of elements 2 are fed in a direction parallel to the first row 3 of elements 2 until a predetermined number of elements 2 that form a second row 4 parallel to the first is located in a predetermined position, so that the second row 4 is complete. The bringing of elements in at least one of the two rows 3, 4 closer to the other then takes place after the second row 4 has reached its predetermined position.

According to a particularly advantageous variant of the invention, the second plurality of elements is provided in that elements intended to form the second plurality of elements are fed from two opposing directions. FIG. 4 and FIG. 6 show that the feed can be undertaken from two opposing directions. FIG. 4 shows for example how a third row 5 of elements 2 is built up while the second row 4 is being brought closer to the first row 3. It is perceived that all rows can be built up in the same way. The two opposing directions are both parallel to the first row 3 of elements and the elements are transported until the elements 2 that are fed in one direction meet elements 2 that have been transported in the opposite direction and together with the elements transported from the other direction form a second row 4 of elements 2. The feed from each direction can also be interrupted after a predetermined number of elements has been transported. It is naturally the case with all embodiments that the feed can be interrupted after a predetermined number of elements has been transported. The bringing of at least one of the two rows 3, 4 closer to the other takes place finally after the second row 4 has been formed.

The interruption of the feed after a predetermined number of elements 2 has been transported can be achieved in the following way, for example. During feeding of the preferably circular-cylindrical elements 2, elements are allowed in both feed directions to pass a detector 6 linked to a control unit/logic unit 7. The logic unit 7, which can consist of a computer 7, senses how many circular-cylindrical elements 2 pass the detector 6 and after a predetermined number of elements 2 has passed, the control unit/logic unit 7 emits a signal that the feed is to be interrupted.

It is preferably the case that all elements 2 are uniform (have the same shape) and that they have a circular-cylindrical shape, so that the composite cell structure 1 formed will consist of a plurality of joined—preferably glued—cylinders. The cylinders 2 can suitably consist of tube pieces 2 with a height of 5 mm to 200 mm and a diameter from 10 mm to 250 mm. A suitable material for the tube pieces can be a cardboard laminate, for example. Other materials are of course also conceivable, such as plastic, wood or metal.

The bringing together of elements in the first 3 and the second row 4 of elements preferably takes place in that elements in the second row 4 are conveyed simultaneously towards the first row 3, so that the whole of the second row 4 is conveyed towards the first row 3 as a coherent unit.

Figure 12A:
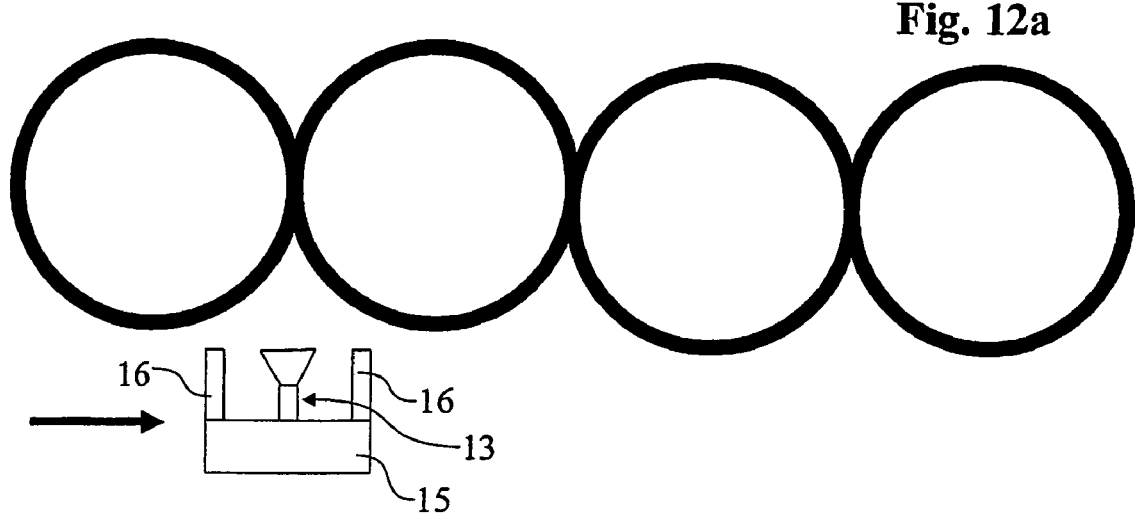
FIG. 12 shows how adhesive can be applied to a row of elements.
Figure 12B:
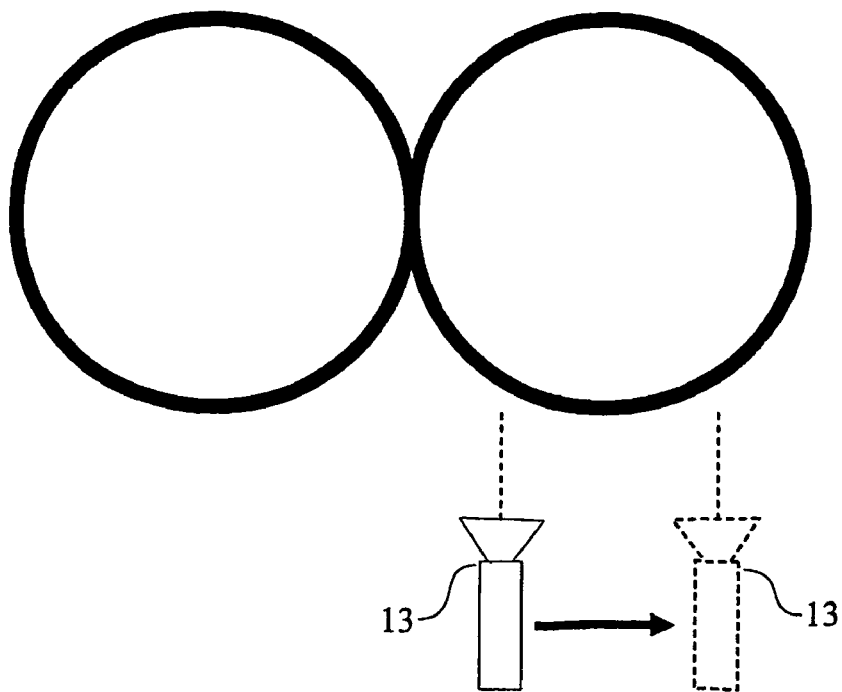
Figure 21:
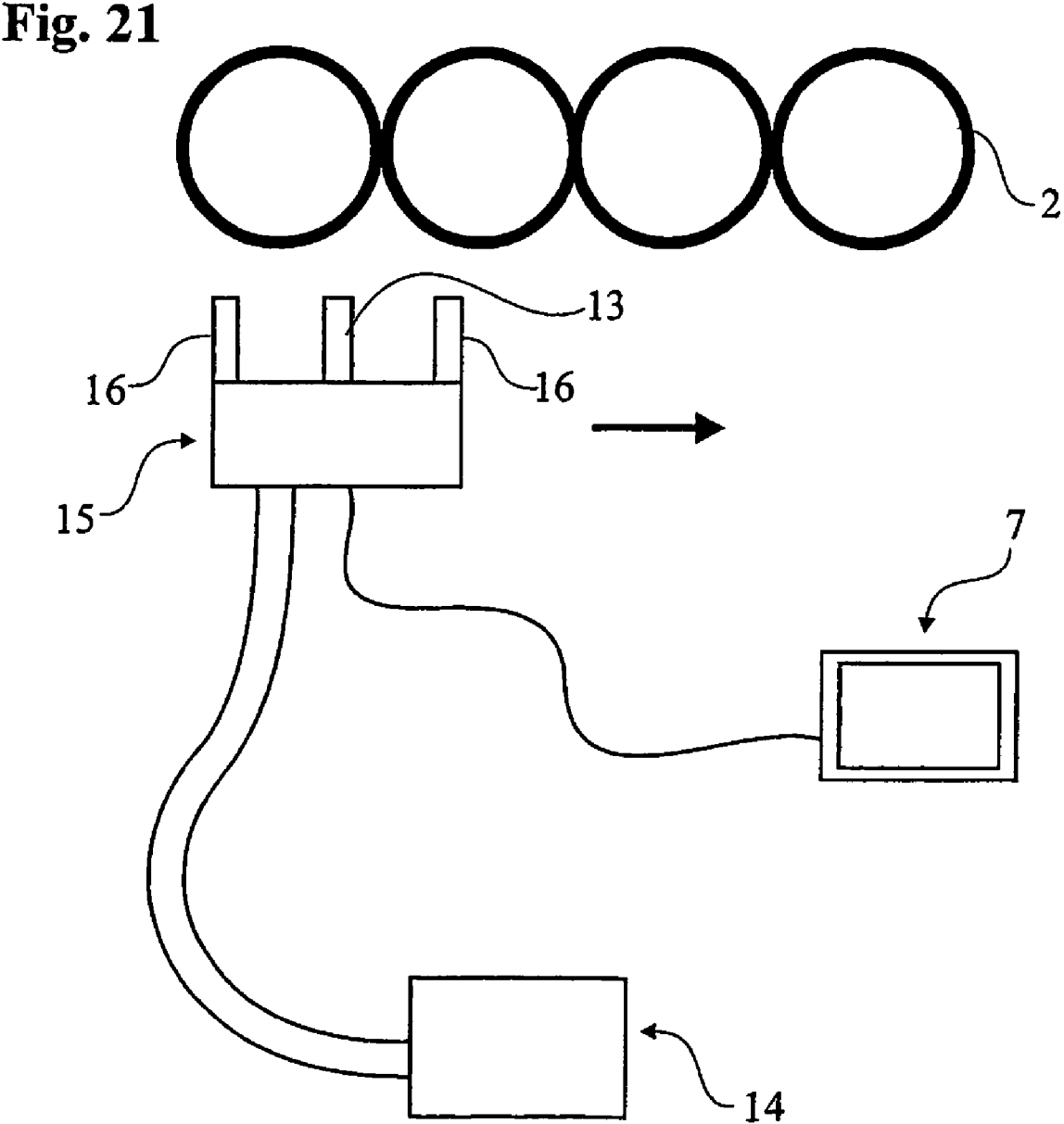
FIG. 21 shows diagrammatically the control of the nozzle for applying adhesive.
Figure 22:
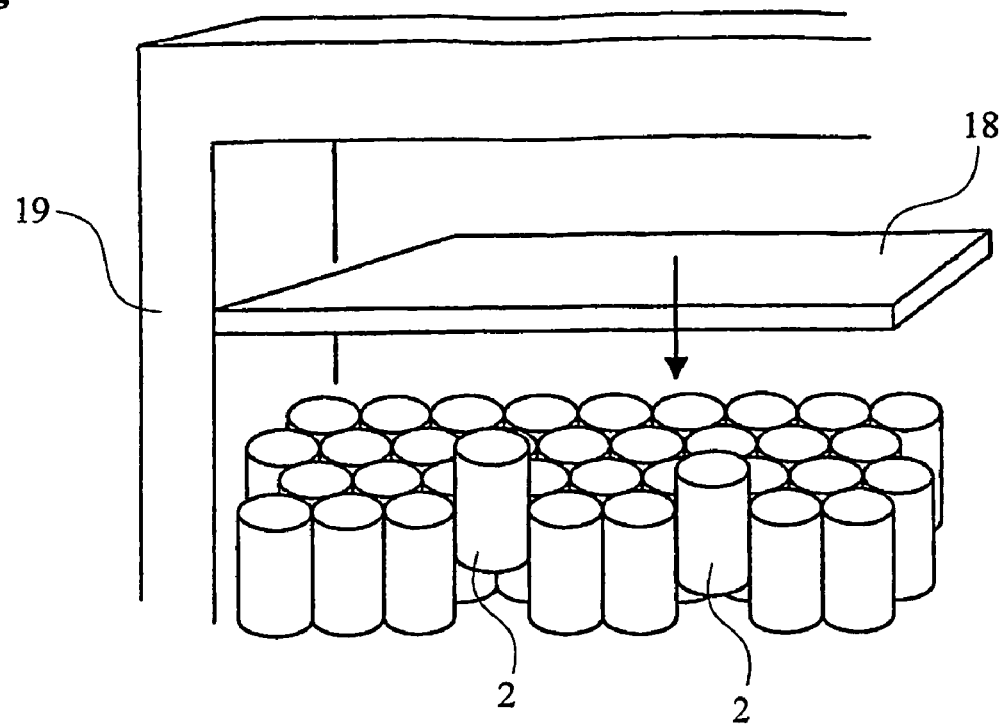
FIGS. 22-24 show in perspective how the position of the elements can be corrected.
Figure 23:
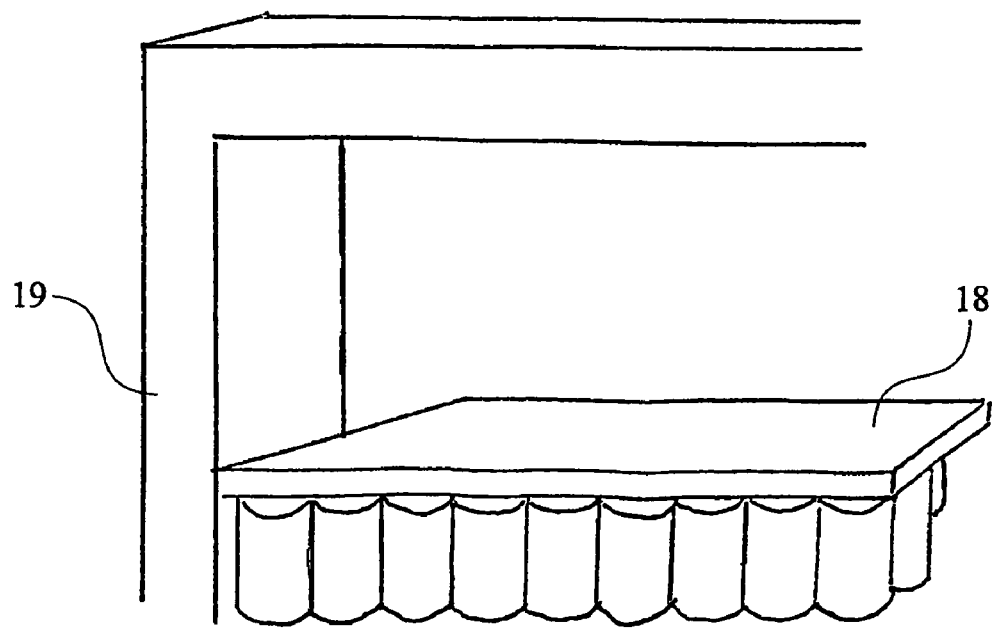
Figure 24:
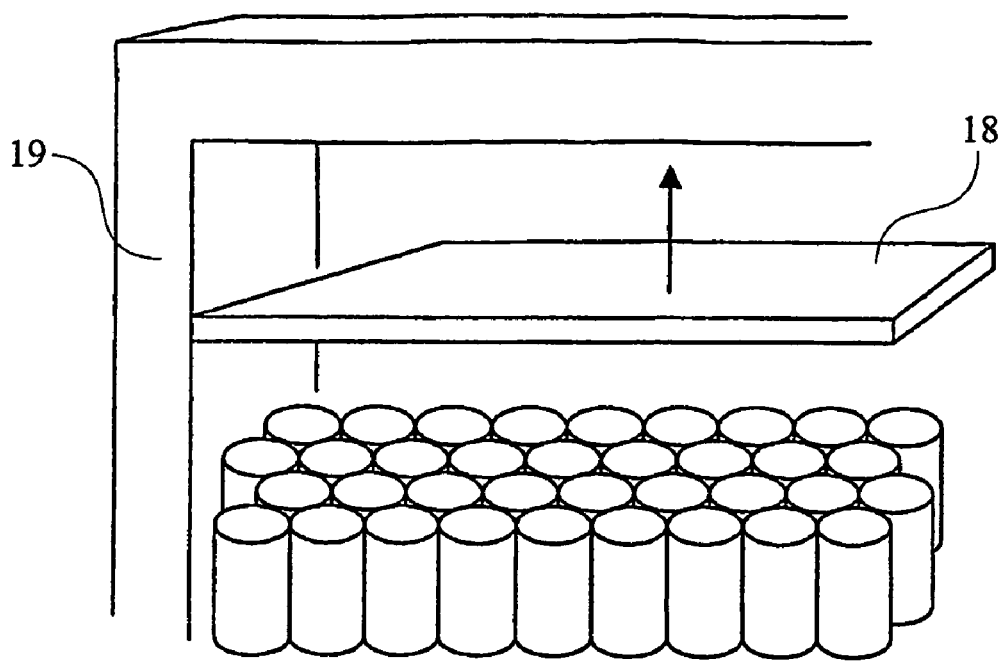

When applying adhesive to elements in a row, this is best carried out as follows. With reference to FIG. 12a, 12b and FIG. 21 it is shown how the adhesive is applied to elements in that a carriage 15 provided with at least one sensor 16 and a nozzle 13 connected to a source 14 of adhesive is guided along the row at a predetermined speed. The sensor 16 is placed at a distance from the nozzle 13 and detects the presence or absence of an element 2. The sensor 16 emits a signal to a logic unit 7 when the presence of an element 2 is detected and the logic unit 7 can then calculate, starting out from the known speed and the distance between the nozzle 13 and the carriage's sensor 16, the time that remains until the nozzle 13 is located in a certain position in relation to an element detected by the sensor. The logic unit 7 can then emit a pulse to activate the nozzle 13 when the time calculated has elapsed, so that adhesive is dispensed towards the preferably circular-cylindrical element 2 when the nozzle 13 passes this. Furthermore, it can thereby be ensured that adhesive is applied to the correct part of the element 2. As shown in FIG. 12b, the nozzle can be arranged to dispense adhesive towards two points 25 along the circumference of a tube piece 2. These two points 25 then constitute joining points in the cellular structure 1. It is perceived in this case that each circular-cylindrical element or tube piece 2 will have four joining points 25 with surrounding elements 2, as shown in FIG. 13. The cell structure 1 will then be built up of circular-cylindrical elements or tube pieces 2 that have six points of contact with surrounding tube pieces, of which four contact points also constitute joining points 25, while two contact points do not constitute joining points 25, as no adhesive is applied to these points.

The invention also relates to a machine for producing a cell structure 1 comprising a plurality of elements 2. With reference to FIG. 14-20, it is shown how the machine according to the invention comprises a guide 8 with inner walls 9 that are preferably straight and form a channel 10 in which a plurality of uniform elements 2 can be fed forwards. The channel 10 can suitably be arranged to be fed from two different directions.

In FIG. 15, 18 and FIG. 4-6 it is shown that the machine according to the invention can comprise a table 17 for receiving a coherent row of elements, which table 17 has a flat working surface on which received elements 2 can slide. The carrier 12 is arranged in this case in such a way in relation to the table 17 that the movement of the carrier 12 forwards to the end position for its movement in the second direction can convey elements from the channel 10 to the table 17 for delivery onto the working surface of the table 17. In a preferred embodiment, the table 17 is movable in a direction perpendicular to the direction of movement of the carrier 12 and parallel to the first direction.

A plate or beam 18 is suitably arranged in connection with the table 17, which plate or beam 18 is movable in a direction to and from the working surface of the table 17. Any positional errors with regard to individual elements 2 can thereby be corrected after two rows have been brought together. With reference to FIGS. 10 and 11 and FIGS. 22-24, it is shown how the beam 18 is used to correct positional errors. One or more elements 2 have come to protrude above the rest of the cell structure during some part of the transportation. After the carrier 12 has delivered a row of elements 2, the beam 18 therefore moves down to lie against the cell structure 1 and will thereby press down any elements 2 projecting.

Figure 14:
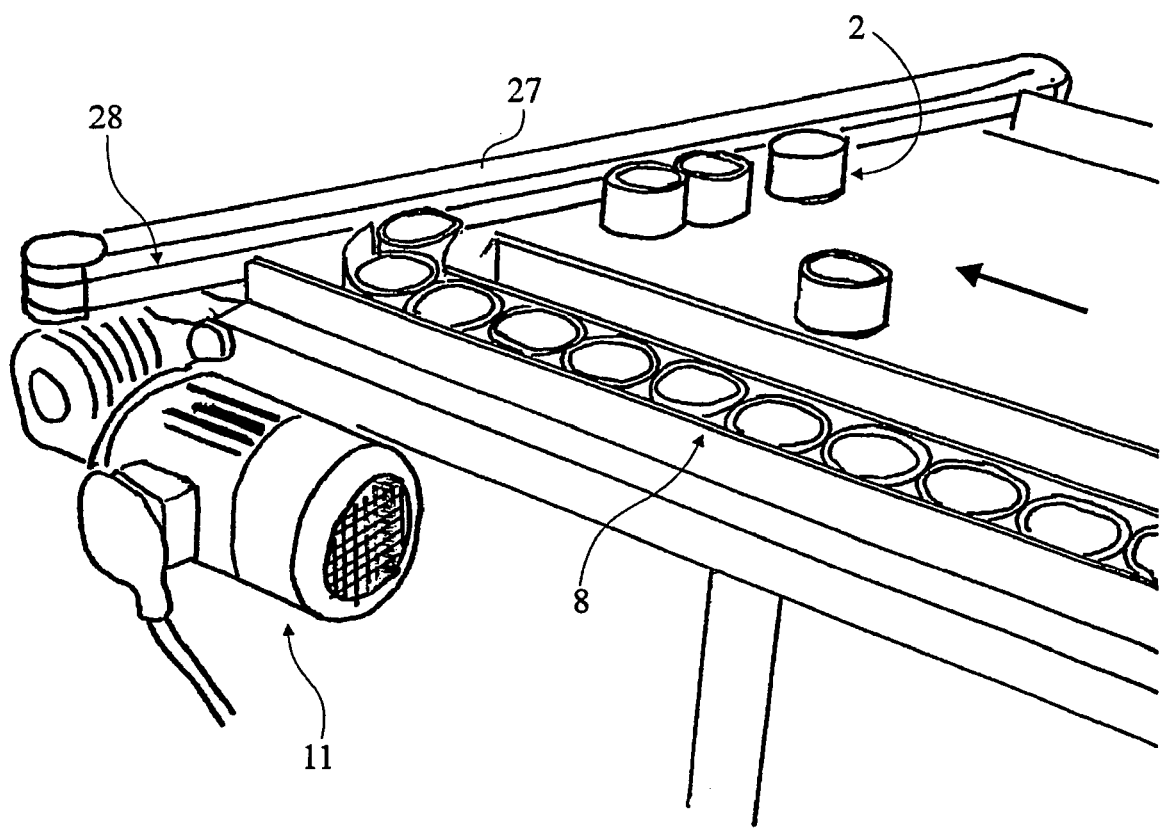
FIG. 14 shows in perspective how circular-cylindrical elements are fed from one end of a machine according to the invention.

The machine also comprises one or more drives/driving devices 11 disposed to act on elements 2 placed in the channel 10 to convey these in a first direction, so that a coherent row of elements 2 can be carried forwards in the channel 10. With reference to FIG. 14 and FIG. 17 it is shown how elements 2 are transported on a conveyor belt 26 towards a guide strip 27 around which a drive belt 28 runs. When the elements 2 reach the guide strip 27 through feeding on the conveyor belt 26, they will be fed by the drive belt 28 towards a guide 8 with rails, the inner walls 9 of which form a channel 10. Both the conveyor belt 26 and the drive belt 28 can be driven by a common driving device 11.

Figure 4:
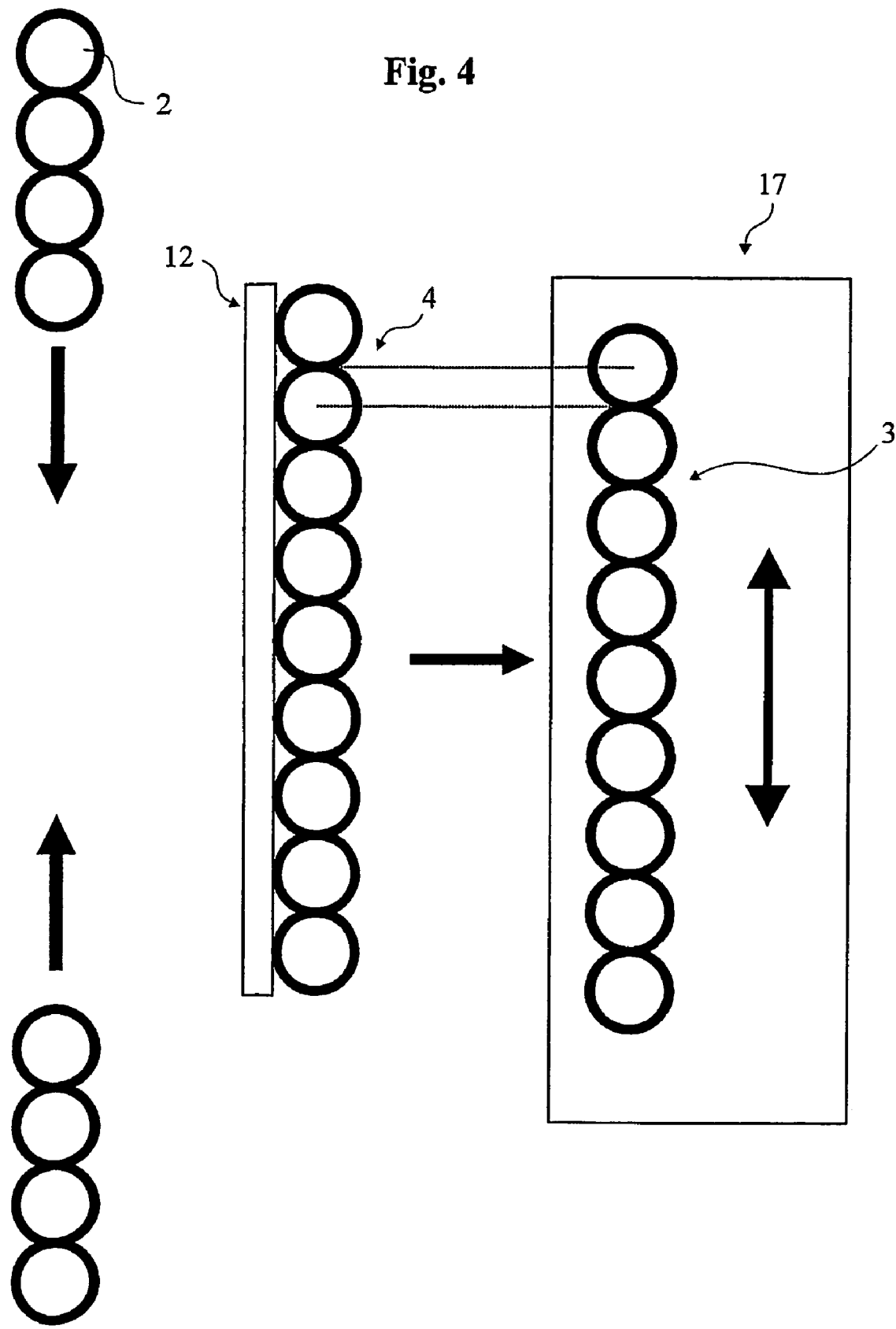
FIG. 4 shows diagrammatically, seen from above, the bringing together of two rows of circular-cylindrical elements during simultaneous transportation of a further row.
Figure 5:
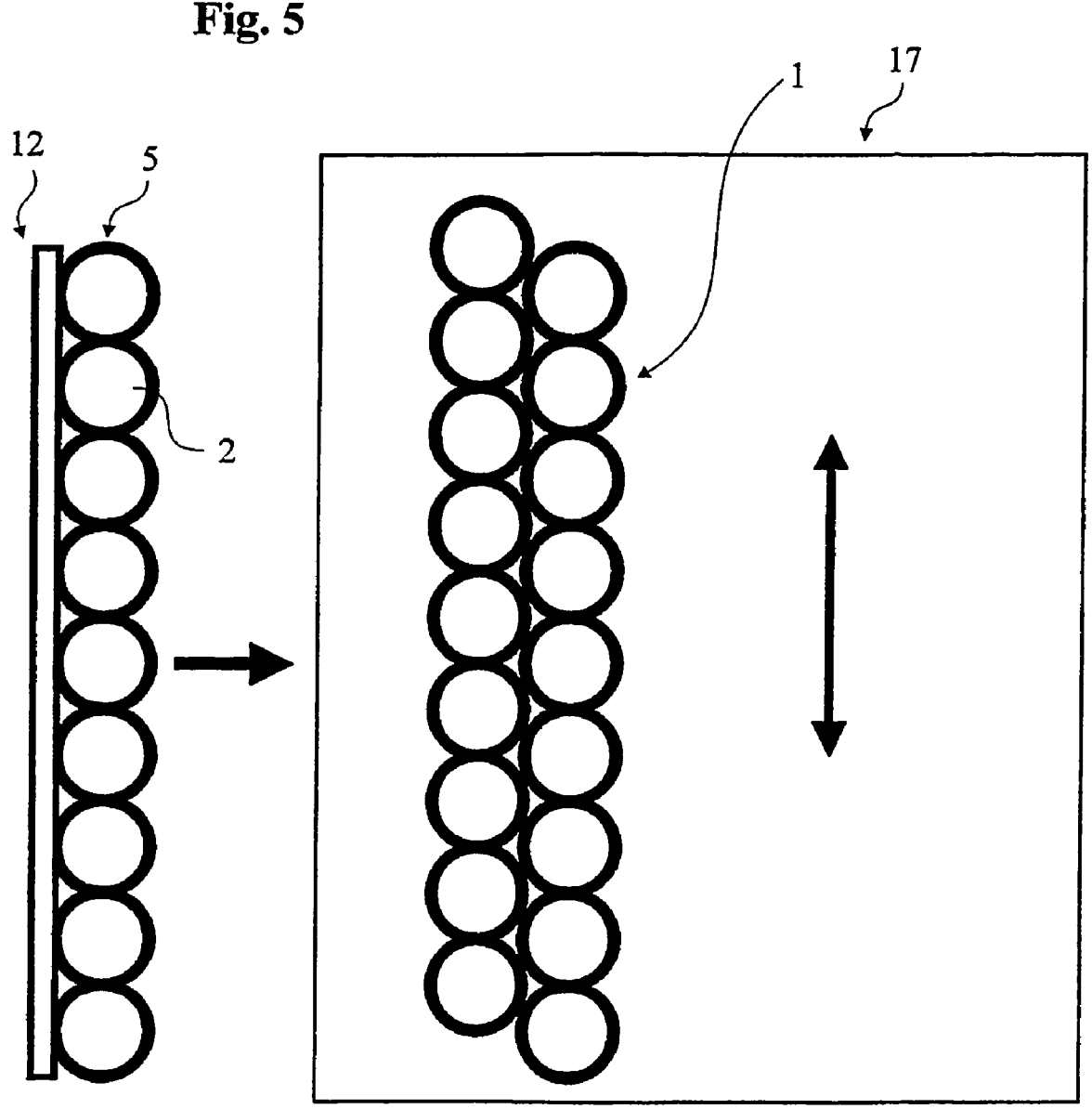
FIG. 5 shows diagrammatically, seen from above, a further step in the production process.
Figure 6:
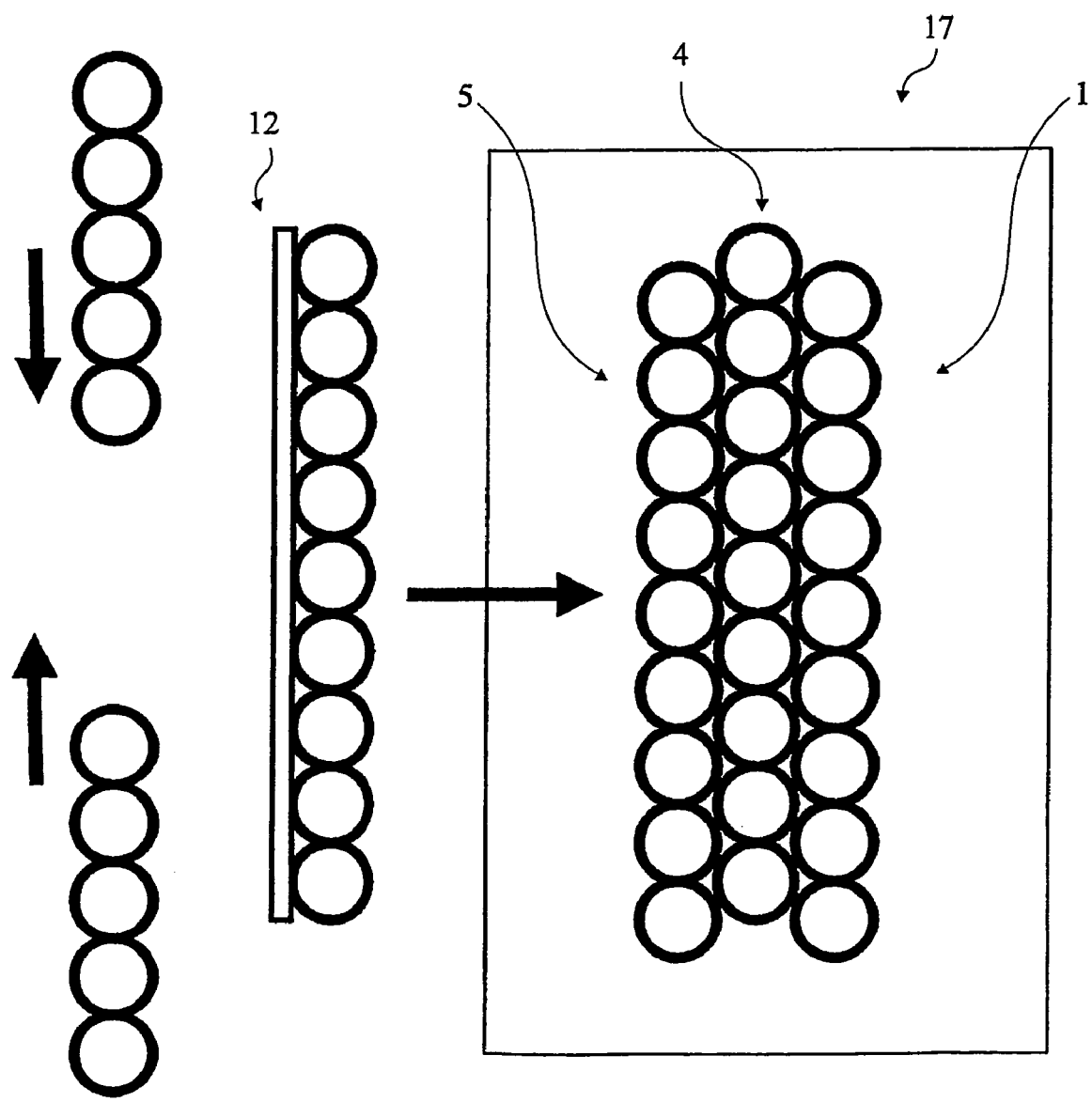
FIG. 6 shows diagrammatically, seen from above, yet another step in the production process.
Figure 7:
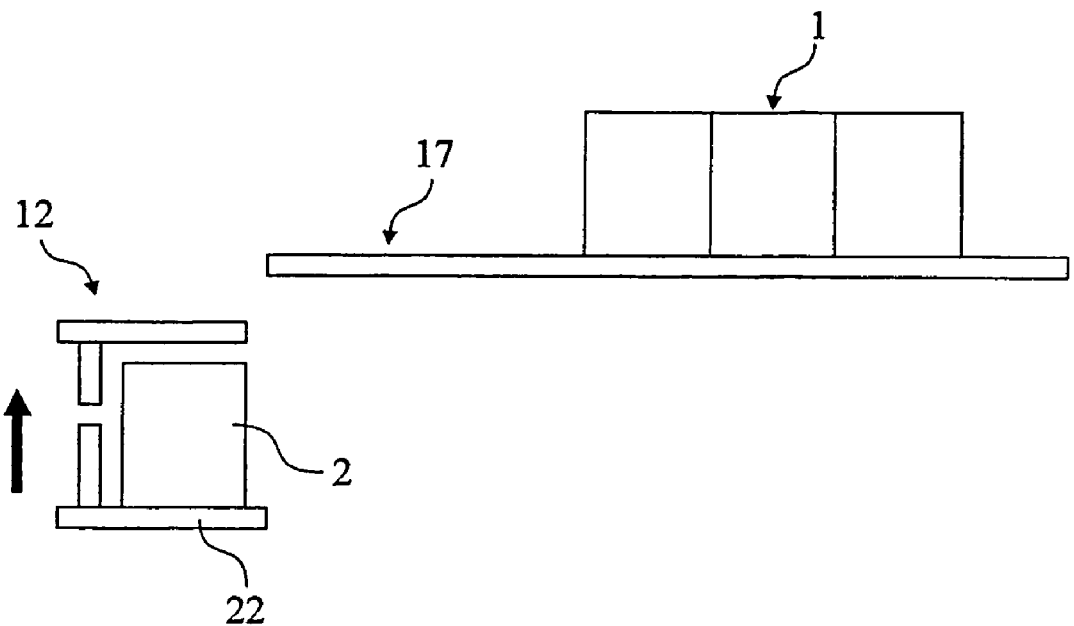
FIGS. 7-11 show diagrammatically and from a lateral perspective steps in the production process corresponding to the steps shown in FIGS. 4-6.
Figure 8:
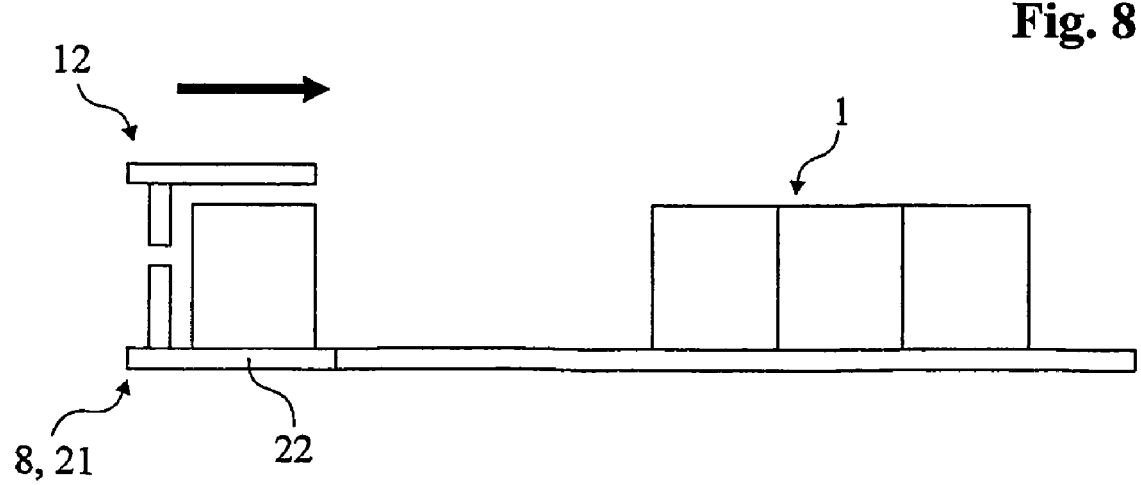
Figure 9:
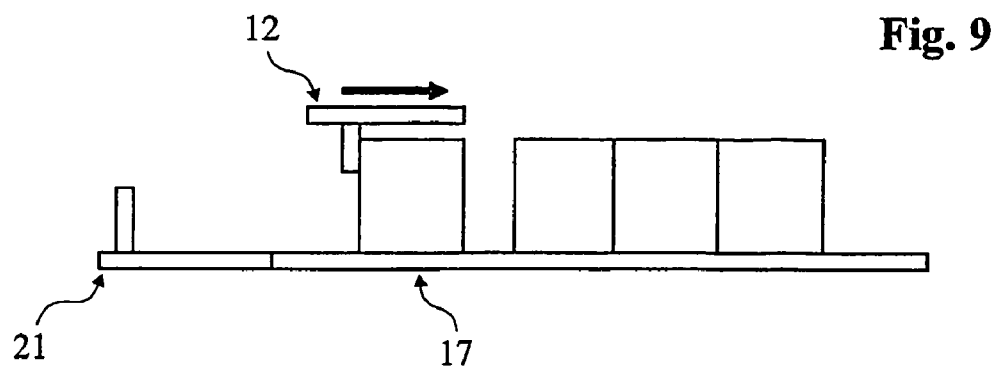
Figure 10:
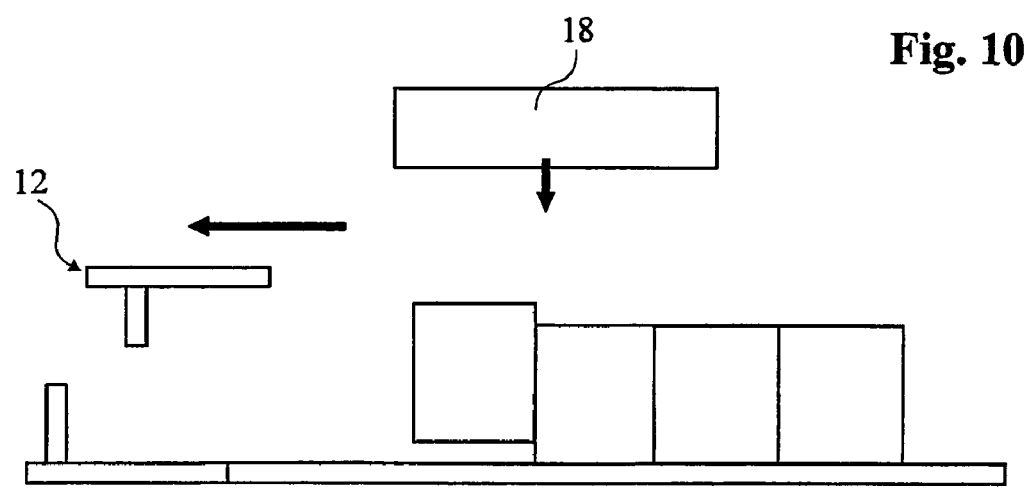
Figure 11:
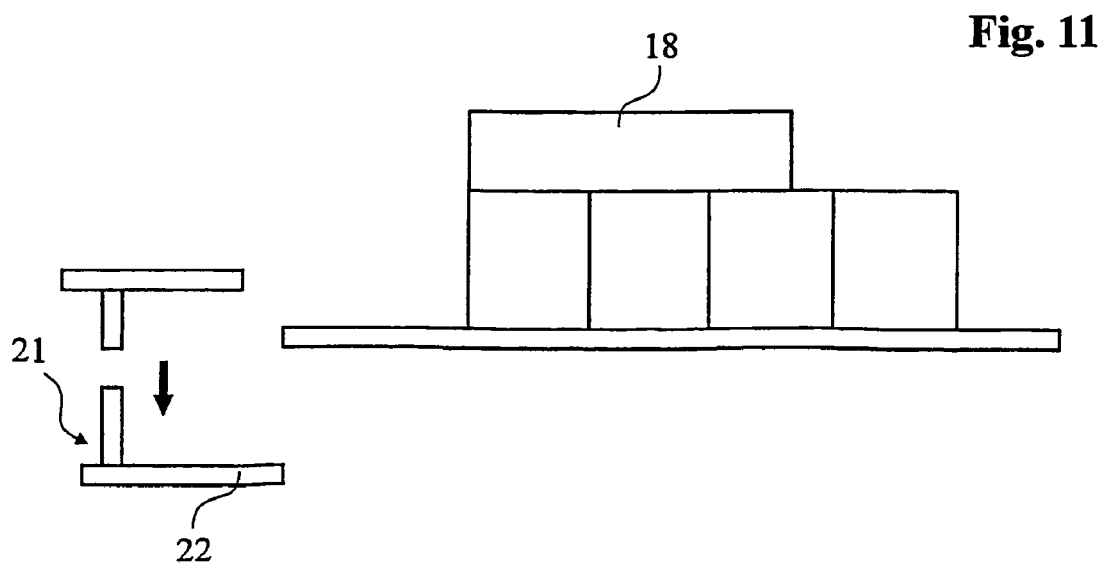
Figure 15:
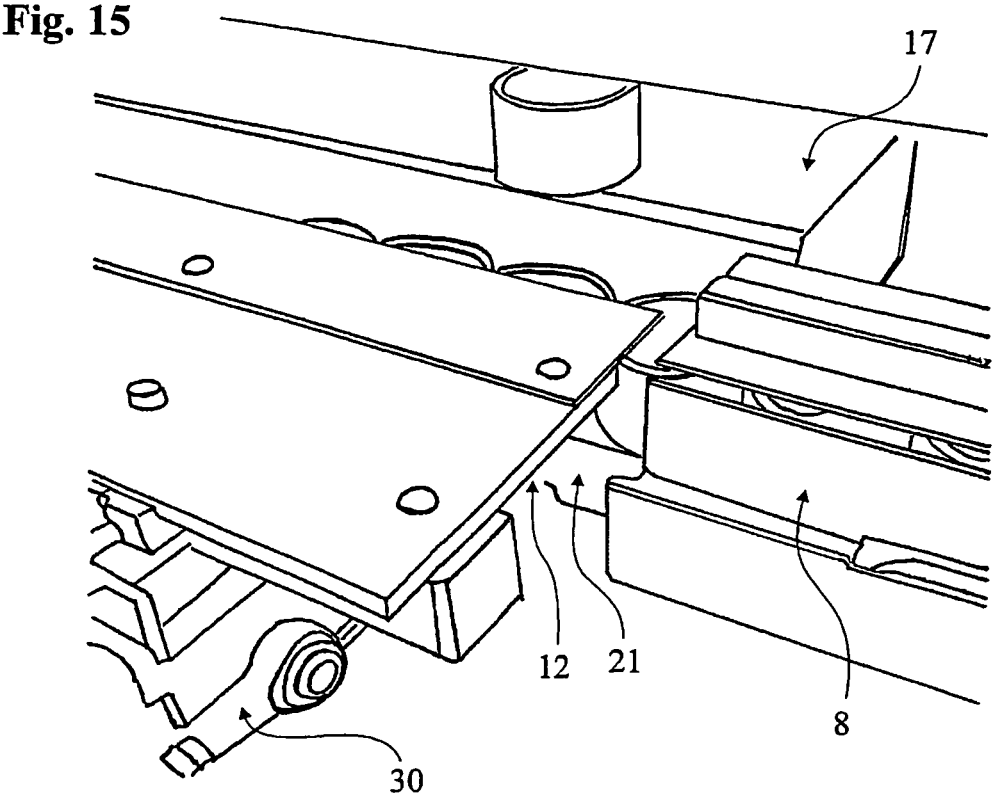
FIG. 15 shows in perspective another part of the machine according to the invention.
Figure 16:
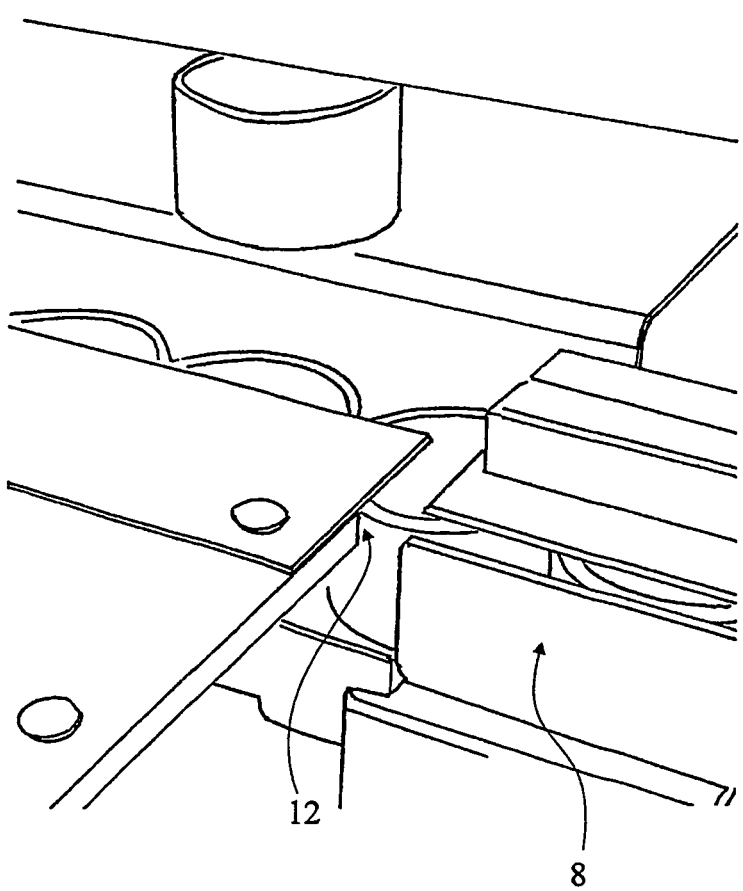
FIG. 16 shows on a larger scale part of what is also shown in FIG. 15.
Figure 19:
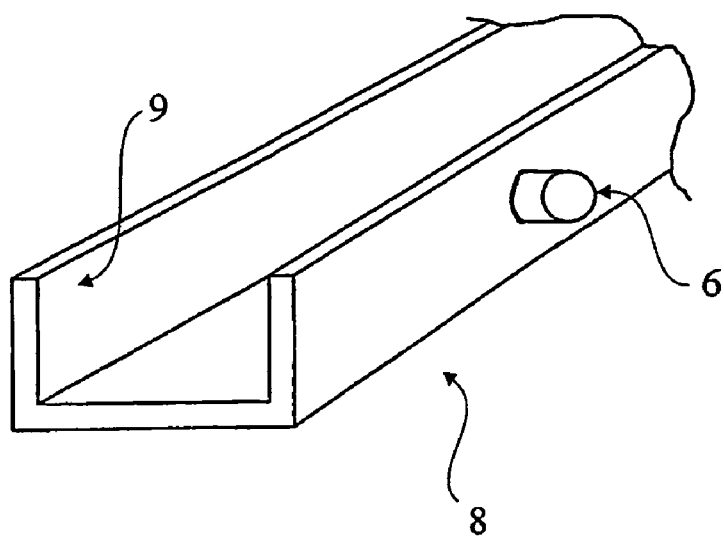
FIG. 19 shows a part of the feed channel in perspective.
Figure 20:
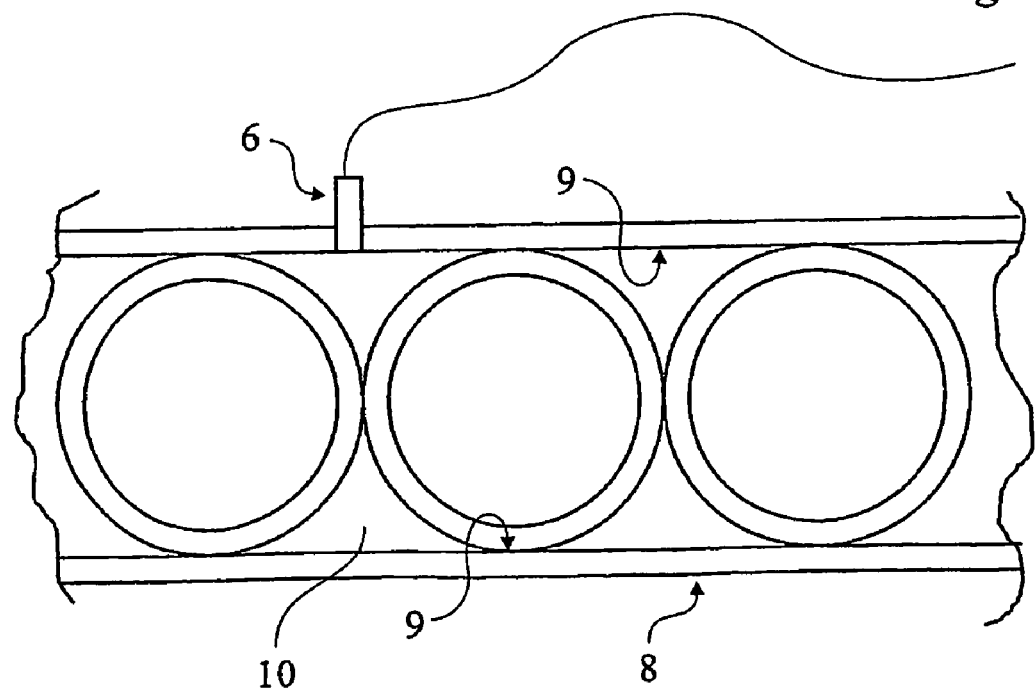
FIG. 20 shows diagrammatically and seen from above a part of the feed channel.
Figure 25A:
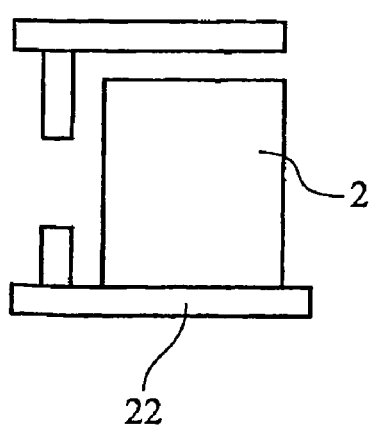
FIGS. 25*a* and *b* show height adjustment for elements of varying height.
Figure 25B:
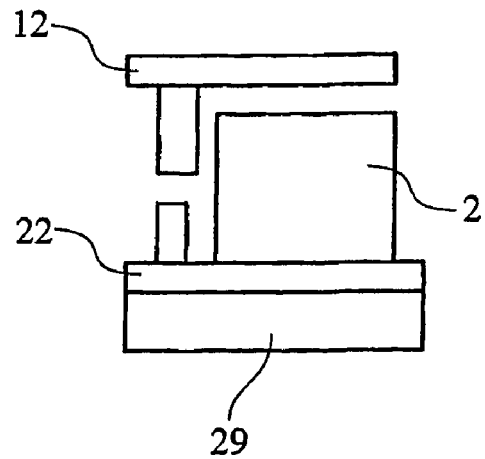

As shown in FIG. 15 and FIG. 16 and in FIG. 4-6, a carrier 12 is arranged in connection with the channel 10 and the carrier 12 has an extension that is principally parallel to the first direction. The carrier 12 is also movable in a second direction chiefly perpendicular to the first direction, so that the carrier 12 can move in the second direction and thereby take with it a coherent row of elements 2 that have been transported in the channel 10, so that the row is transported to an end position for movement of the carrier 12 in the second direction. In an advantageous embodiment (see FIG. 18, for example) the guide 8 comprises two fixed parts 20 and a movable part 21, the movable part 21 of the guide 8 being disposed to be able to move in the vertical direction (see FIGS. 7, 8 and 11) together with the carrier 12 from a first position, in which the movable guide part 21 is located in a plane separate from the working surface of the table, to a second position in which at least a part of the movable guide part 21 is located on a level with the working surface of the table 17. The movable guide part 21 comprises a support 22, on which elements for the cellular structure 1 can be placed, which support 22 form is a floor in the channel 10 and the support 22 can be adjusted in the vertical direction, so that elements of different height can be placed in the correct position in relation to the carrier 12. With reference to FIG. 25a, it is shown diagrammatically how circular-cylindrical elements of a certain height are received in the movable control part 21. With reference to FIG. 25b, it shall now be explained how elements of a lower height are handled. To receive elements 2 of a different height, a spacer 29 is used to lift the support 22 that forms the floor in the channel. It is thereby ensured that the carrier 12 continues to be in the correct position in relation to the elements 2 in the channel, in spite of the fact that the height of the elements 2 is now lower.

As shown in FIG. 12, the machine is best provided with at least one nozzle 13 that is connected to a source 14 of adhesive. The nozzle 13 is disposed to be movable in a direction parallel to the first direction and is either arranged to apply adhesive to a row of elements 2 that has just been conveyed to the end position, or to apply adhesive to a row of elements 2 before these have begun to be conveyed towards the end position by the carrier 12. The nozzle 13 can thus move along a coherent group of elements 2 and apply adhesive to these.

In an advantageous embodiment of the invention, at least one sensor 6 is located connected to the channel 10 and disposed to detect the elements transported in the channel 10 as shown in FIGS. 18-21. The sensor 6 is suitably connected in this case to the driving device 11—for example via a logic unit 7—so that the transportation of elements 2 can be interrupted when a predetermined number of elements 2 has passed the sensor 6.

The machine is preferably provided with a stand 19, on which a carriage 15 is arranged movably in connection with the working surface of the table 17, see FIG. 21. The nozzle 13 is arranged on the carriage 15 so that on movement of the carriage 15 the nozzle 13 can be guided along a row of elements 2 standing on the working surface of the table 17. The carriage 15 is provided here with at least one sensor 16 that can detect the presence of an element placed on the table 17. The sensor 16 is placed at a distance from the nozzle 13 in the direction of movement of the carriage. The carriage 15 preferably has two sensors 16. The carriage 15 can be driven at a predetermined speed and the machine includes a logic unit 7 that knows the predetermined speed and the distance between the sensor or sensors 16 and the nozzle 13 of the carriage 15. The logic unit 7 is also connected to the sensor 16 of the carriage 15, so that while the carriage 15 is moving the logic unit 7 can calculate the time remaining before the nozzle 13 is located in a certain position in relation to an element 2 detected by the sensor 16.

The machine operates in the following way. When the drive 11 is activated, elements 2 are carried by the conveyor belt 26 towards the drive belt 28, which pushes the elements into the channel 10. Due to the pressure from elements coming from behind, the elements 2 are carried forwards in the channel 10. The elements 2 will thus pass the detector 6, which will emit a signal to the logic unit 7 for each element 2 that passes. When a predetermined number of elements 2 has passed the detector 6, the logic unit 7 will order the drive 11 to stop. Feeding then ceases. The predetermined number of elements 2 is the number required to fill the movable guide part 21. Feeding is thus interrupted when the channel 10 of the movable guide part 21 is full of circular-cylindrical elements or tube pieces 2. The detectors 6 can be located in either the movable guide part 21 or in one of the fixed guide parts 20 or in both the movable guide part 21 and the fixed guide parts 20. If it is elected to place detectors 6 in the movable guide part 21, however, it is not necessary to count passing elements. One or more detectors 6 can be placed instead connected to the centre of the channel 10 of the movable guide part 21. The detector or detectors 6 then detect quite easily that circular-cylindrical elements 2 have reached the centre of the channel 10 from both feed directions. The logic unit 7 that is connected to the detectors 6 can then draw the conclusion that the channel 10 of the movable guide part 21 is completely full and interrupt the feed of new elements 2. It is of course possible to let the logic unit 7 both count the elements 2 that pass a detector 6 and also detect whether the channel 10 of the movable guide part is full.

When the channel 10 of the movable guide part 21 is full and feeding has been made to stop, the movable guide part 21 and the carrier 12 are located somewhat below the level of the table 17. By means of lifting devices that are not shown, for example hydraulic or pneumatic cylinders, the guide part 21 is lifted together with the carrier 12 up to a level where the floor of the guide part is on a level with the working surface of the table 17. The actuating device 30 now pushes the carrier 12 in over the working surface of the table 17. A row 4 of circular-cylindrical elements 2 will thereby be conveyed by the carrier 12 in onto the working surface of the table 17. It may now be assumed that a preceding row 3 of circular-cylindrical elements 2 has already been delivered onto the working surface of the table 17 in a preceding work step. While the new row 4 was being transported, the following happened. The carriage 15 conveyed the nozzle 13 along the row 3, the carriage sensors 16 detecting the presence of elements 2 in the row 3. The nozzle 13 sprayed adhesive at two points on each element 2. In addition, the table 17 was moved a distance in a direction parallel to the feed direction of elements 2 in the channel 10. The table 17 was moved in this case a distance that is half the diameter of one of the circular-cylindrical elements. The row 3 is thereby displaced in phase. In principle, phase displacement can also be obtained by selecting a different distance, but not movement by a distance that constitutes a whole diameter of a circular-cylindrical element or a whole number of cylinder diameters.

The preceding row 3 is then displaced in phase in relation to the next row 4 that is delivered onto the table and the elements 2 in the preceding row 3 have also been provided with adhesive, for example a glue. When the carrier 12 conveys the new row 4 towards the preceding row 3, the new row 4 is conveyed to lie close to the preceding row 3 and is bonded to this by the adhesive that has been applied to the elements 2 in the preceding row 3. The new row 4 will also push the preceding row 3 backwards across the table 17. The new row 4 and the preceding row 3 now form a composite cell structure 1.

The carrier 12 will then be retracted at the same time as the beam 18 is made to execute a working stroke downwards and move down to lie close to the cell structure 1. Elements 2 that stick up from the cell structure 1 will then be pressed down into the correct position. The levelling beam 18 then travels up again. During this time the carrier 12 has been retracted to its position in connection with the channel 10. The movable guide part 21 now moves down to the feed position, whereupon a new working cycle can be started. New elements 2 are carried forwards in the channel 10 and the carriage 15 will move along the new row 4 in the cell structure 1 and adhesive will be applied to the elements 2 in the new row 4. Furthermore, the table 17 will again be moved by a certain distance, but in the opposite direction to the preceding movement of the table 17, so that the table 17 returns to its previous position. It is thereby ensured that the newly coated row 4 will be displaced in phase in relation to the next row 5.

A quick and operationally reliable way of producing cell structures is offered by the invention. If feeding from two directions is used, the advantage is obtained that the cycle times are lower. Due to the fact that the level of the floor of the channel can be adjusted, the advantage is achieved that tube pieces of different height can be used. By using a levelling beam, the advantage is achieved that an incorrect position of elements forming part of the cell structure can be corrected.

Due to the fact that the carriage with the nozzle is provided with sensors linked to a logic unit, the advantage is achieved that adhesive can be placed on the elements in the desired position. The consumption of adhesive is also reduced thereby. If the table is arranged movably, the advantage is achieved that all elements in a row can be displaced in phase easily in relation to the next row. If the feed is controlled by a logic unit linked to sensors, the advantage is achieved that the feed can be interrupted automatically. If a whole row is moved towards a preceding row as a coherent unit, the advantage is achieved that the production process is quicker than if elements are moved singly. If detectors are placed in the movable guide part, the advantage is achieved that the feed can be controlled according to whether the channel is full.

As the channel is not locked at the same height as the table, but can be raised and lowered, space is provided for the nozzle.

The invention claimed is:

1. Method for making a cellular structure comprising a plurality of uniform hollow circular-cylindrical elements having an open end, which method comprises the following steps:
    a) providing a first plurality of uniform hollow circular-cylindrical elements standing on an open end and parallel to one another, which for a first row of elements;
    b) providing a second plurality of the uniform hollow circular-cylindrical elements standing on an open end and parallel to one another, which form a second row of elements, the second row containing as many elements as the first row and being parallel to the first row but displaced by a certain distance in its longitudinal direction in relation to the first row, which distance is less than the extension of one of the uniform elements in the longitudinal direction of the two rows;
    c) applying an adhesive to the elements in at least one of the two rows;
    d) bringing at least one of the two rows closer to the other so that the two rows are brought together and thereby bonded to one another by the adhesive,
        wherein the second plurality of elements is provided in that elements intended to form the second plurality of elements are fed from two opposite directions, which opposite directions are both parallel to the first row of elements, the elements being transported until the elements that are fed in one direction meet elements that have been transported in the opposite direction and together with the elements transported from the other direction form a second row of elements, and the bringing of at least one of the two rows closer to the other taking place after the second row has been formed.

2. Method for making a cellular structure comprising a plurality of uniform hollow circular-cylindrical elements having an open end, which method comprises the following steps:
    a) providing a first plurality of uniform hollow circular-cylindrical elements standing on an open end and parallel to one another, which for a first row of elements;
    b) providing a second plurality of the uniform hollow circular-cylindrical elements standing on an open end and parallel to one another, which form a second row of elements, which second row is parallel to the first row;
    c) applying an adhesive to the elements in at least one of the two rows;

d) bringing at least one of the two rows closer to the other so that the two rows are brought together and thereby bonded to one another by the adhesive so that the two rows thereby form a composite cellular structure, which cellular structure is then located in a first position, wherein the second plurality of elements is provided in that elements intended to form the second plurality of elements are fed from two opposite directions, which opposite directions are both parallel to the first row of elements, the elements being transported until the elements that are fed in one direction meet elements that have been transported in the opposite direction and together with the elements transported from the other direction form a second row of elements, and the bringing of at least one of the two rows closer to the other taking place after the second row has been formed;

e) providing a third plurality of the hollow circular-cylindrical uniform elements standing on an open end and parallel to one another, which form a third row of elements, which third row of elements is parallel to the first and second rows in the composite cellular structure;

f) moving the cellular structure a certain distance in the longitudinal direction of the first and the second row of elements, so that the cellular structure is moved from the first position to a second position;

g) applying an adhesive to the elements in at least one of the second row and third row, the adhesive being applied either before, after or at the same time as the cellular structure is moved to the second position;

h) bringing the third row and the cellular structure together with one another so that they are thereby bonded to one another by the adhesive, due to which the third row becomes part of the cellular structure, wherein the third plurality of elements is provided in that elements intended to form the third plurality of elements are fed from two opposite directions, which opposite directions are both parallel to the first and second row of elements, the elements being transported until the elements that are fed in one direction meet elements that have been transported in the opposite direction and together with the elements transported from the other direction form a third row of elements, and the bringing of at least one of the third row and the cellular structure closer to the other taking place after the third row has been formed.

3. Method for making a cellular structure comprising a plurality of uniform hollow circular-cylindrical elements having an open end, which method comprises the following steps:

a) providing a first plurality of uniform hollow circular-cylindrical elements standing on an open end and parallel to one another, which for a first row of elements;

b) providing a second plurality of the uniform hollow circular-cylindrical elements standing on an open end and parallel to one another, which forms a second row of elements;

c) applying an adhesive to the elements in at least one of the two rows;

d) bringing the elements in at least one of the two rows closer to the other so that the two rows are brought together and thereby bonded to one another by the adhesive to form a cellular structure thereby, wherein the second plurality of elements is provided in that elements intended to form the second plurality of elements are fed from two opposite directions, which opposite directions are both parallel to the first row of elements, the elements being transported until the elements that are fed in one direction meet elements that have been transported in the opposite direction and together with the elements transported from the other direction form a second row of elements, and the bringing of at least one of the two rows closer to the other taking place after the second row has been formed.

4. Method according to claim 3, wherein the second plurality of elements is provided in that elements intended to form the second plurality of elements are fed in a direction parallel to the first row of elements until a predetermined number of elements, which form a second row parallel to the first, are located in a predetermined position, so that the second row is complete and the bringing of the elements in at least one of the two rows closer to the other taking place after the second row has reached its predetermined position.

5. Method according to claim 3, wherein the feed from each direction is interrupted after a predetermined number of elements has been transported.

6. Method according to claim 4, wherein the feed is interrupted after a predetermined number of elements has been transported.

7. Method according to claim 4, wherein all elements have the same shape and that they have a circular-cylindrical shape.

8. Method for making a cellular structure comprising a plurality of uniform hollow circular-cylindrical elements having an open end, which method comprises the following steps:

a) providing a first plurality of uniform hollow circular-cylindrical elements standing on an open end and parallel to one another, which for a first row of elements;

b) providing a second plurality of the uniform hollow circular-cylindrical elements standing on an open end and parallel to one another, which form a second row of elements, which second row is parallel to the first row but displaced in phase in relation to the first row;

c) applying an adhesive to the elements in at least one of the two rows;

d) bringing the elements in at least one of the two rows closer to the other so that the two rows are brought together and thereby bonded to one another by the adhesive to thereby form a composite cellular structure, wherein the second plurality of elements is provided in that elements intended to form the second plurality of elements are fed from two opposite directions, which opposite directions are both parallel to the first row of elements, the elements being transported until the elements that are fed in one direction meet elements that have been transported in the opposite direction and together with the elements transported from the other direction form a second row of elements, and the bringing of at least one of the two rows closer to the other taking place after the second row has been formed.

9. Method according to claim 8, wherein a third plurality of elements is provided, the elements in the third plurality of elements having the same shape as the elements in the first and the second plurality and forming a third row of elements, which third row of elements is parallel to the rows in the composite cellular structure, that the composite cellular structure is moved a certain distance in the longitudinal direction of the first and second rows of elements from a first position of the composite cellular structure to a second position, that an adhesive is applied to the elements in at least one of the second row and the third row, the adhesive being applied either before, after or at the same time as the cellular structure is moved to the second position and in that the third row and the cellular structure following movement of the cellular structure and application of the adhesive are brought together with one another so they are thereby bonded to one another by the adhesive, due to which the third row becomes a part of the composite cellular structure.

10. Method according to claim 8, wherein the feed from each direction is interrupted after a predetermined number of elements has been transported and that the second row and the first row are brought together with one another after the feed has been interrupted.

11. Method according to claim 10, wherein the bringing together of the elements in the first and the second row of elements takes place in that the elements in the second row are conveyed simultaneously towards the first row so that the whole of the second row is conveyed towards the first row as a coherent unit.

12. Method according to claim 11, wherein during feeding of the circular-cylindrical elements, the elements are allowed in both feed directions to pass a detector linked to a control unit and it is recognized in this way how many circular-cylindrical elements pass the detector and that after a predetermined number of elements has passed, the logic unit emits a signal that the feed is to be interrupted.

13. Method according to claim 8, wherein adhesive is applied to the elements in a row in that a carriage provided with at least one sensor and a nozzle connected to a source of adhesive is guided along the row at a predetermined speed, the sensor being placed at a distance from the nozzle and detecting the presence or absence of an element and emitting a signal to a logic unit when the presence of an element is detected, and the logic unit, starting out from the known speed and the distance between the nozzle and the sensor of the carriage, calculates the time that remains until the nozzle is located in a certain position in relation to an element detected by the sensor and sends a pulse to activate the nozzle when the time calculated has elapsed.

* * * * *